(12) United States Patent
Bischof et al.

(10) Patent No.: US 8,413,877 B2
(45) Date of Patent: Apr. 9, 2013

(54) LAYERED STRUCTURES WITH INTEGRAL BRAZING MATERIALS

(75) Inventors: Christopher J. Bischof, Southlake, TX (US); Michael J. Minor, Arlington, TX (US); Paul M. Pellet, Arlington, TX (US); Jason E. Huxol, Mansfield, TX (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/233,418

(22) Filed: Sep. 15, 2011

(65) Prior Publication Data

US 2012/0000967 A1    Jan. 5, 2012

Related U.S. Application Data

(62) Division of application No. 11/799,012, filed on Apr. 30, 2007, now abandoned.

(51) Int. Cl.
*B23K 31/02* (2006.01)

(52) U.S. Cl.
USPC .............. 228/245; 228/225; 228/254

(58) Field of Classification Search .............. None
See application file for complete search history.

(56) References Cited

U.S. PATENT DOCUMENTS

| | | | |
|---|---|---|---|
| 4,026,677 A | 5/1977 | Galasso et al. | |
| 4,034,454 A | 7/1977 | Galasso et al. | |
| 4,034,906 A | 7/1977 | Carlson et al. | |
| 4,832,252 A * | 5/1989 | Fraser | 228/119 |
| 5,062,205 A * | 11/1991 | Fraser | 29/889.7 |
| 5,284,290 A | 2/1994 | Moore et al. | |
| 5,318,406 A * | 6/1994 | Bardes | 416/223 A |
| 5,448,828 A * | 9/1995 | Willems et al. | 29/889.1 |
| 5,464,146 A | 11/1995 | Zaluzec et al. | |
| 5,788,823 A | 8/1998 | Warnes et al. | |
| 5,989,733 A | 11/1999 | Warnes et al. | |
| 6,129,991 A | 10/2000 | Warnes et al. | |
| 6,199,746 B1 * | 3/2001 | Dupree et al. | 228/119 |
| 6,454,156 B1 * | 9/2002 | Taras et al. | 228/165 |
| 6,470,568 B2 * | 10/2002 | Fried et al. | 29/889.1 |
| 6,530,971 B1 | 3/2003 | Cohen et al. | |
| 6,531,005 B1 | 3/2003 | Bezerra et al. | |
| 6,672,501 B2 * | 1/2004 | Fried | 228/119 |
| 6,685,431 B2 | 2/2004 | Hiskes | |
| 6,921,014 B2 | 7/2005 | Hasz et al. | |
| 7,051,435 B1 | 5/2006 | Subramanian et al. | |
| 7,073,247 B2 | 7/2006 | Rowe et al. | |
| 7,293,688 B2 * | 11/2007 | Ozbaysal | 228/56.3 |

(Continued)

FOREIGN PATENT DOCUMENTS

| | | |
|---|---|---|
| EP | 1219375 | 3/2002 |
| JP | 2006142310 | 6/2006 |
| JP | 2006272363 | 10/2006 |

OTHER PUBLICATIONS

European Search Report, mailed Jul. 7, 2009.

*Primary Examiner* — Kiley Stoner
(74) *Attorney, Agent, or Firm* — Kinney & Lange, P.A.

(57) ABSTRACT

A layered structure comprising a base structure having a major surface, and a brazing layer secured to the major surface of the base structure, where the brazing layer is applied to the major surface prior to positioning the layered structure in contact with a turbine engine component.

11 Claims, 2 Drawing Sheets

U.S. PATENT DOCUMENTS

| | | |
|---|---|---|
| 7,303,112 B2 * | 12/2007 | Ivory et al. .................... 228/119 |
| 7,331,755 B2 * | 2/2008 | Broderick et al. ............ 415/191 |
| 7,343,676 B2 * | 3/2008 | Ng .............................. 29/889.1 |
| 2003/0034379 A1 * | 2/2003 | Jackson et al. ................ 228/119 |
| 2003/0082048 A1 * | 5/2003 | Jackson et al. ................ 415/115 |
| 2003/0200835 A1 | 10/2003 | Malie et al. |
| 2004/0050913 A1 | 3/2004 | Philip |
| 2004/0091627 A1 * | 5/2004 | Ohara et al. .................. 427/402 |
| 2004/0169063 A1 | 9/2004 | Stueber et al. |
| 2004/0262366 A1 * | 12/2004 | Kinstler ........................ 228/119 |
| 2005/0067466 A1 * | 3/2005 | Boegli et al. .................. 228/119 |
| 2006/0042082 A1 | 3/2006 | Minor et al. |
| 2006/0049236 A1 | 3/2006 | Minor et al. |
| 2006/0242816 A1 | 11/2006 | Magdy |
| 2007/0087208 A1 | 4/2007 | Ng et al. |
| 2008/0263865 A1 * | 10/2008 | Daniels et al. ............. 29/889.71 |
| 2009/0286102 A1 * | 11/2009 | Mohyi Hapipi et al. ...... 428/613 |
| 2010/0189555 A1 * | 7/2010 | Quinn et al. .................. 415/200 |

* cited by examiner

LAYERED STRUCTURES WITH INTEGRAL BRAZING MATERIALS

CROSS REFERENCE TO RELATED APPLICATIONS

This application is a divisional application of U.S. application Ser. No. 11/799,012, filed Apr. 30, 2007, now abandoned. This reference is incorporated herein.

BACKGROUND

The present invention relates to manufacturing components and processes for aerospace applications. In particular, the present invention relates to gas turbine engine components and brazing operations for manufacturing gas turbine engine components.

During the manufacture of gas turbine engines, many turbine engine components are secured together with brazing operations. For example, when manufacturing hollow turbine airfoil components (e.g., components of turbine blades and vanes), the passages of the airfoil components are typically covered with cover plates (e.g., meter plates). The cover plates are tack welded onto the airfoil component, and then a brazing alloy is applied externally to fill the gaps between the cover plate and the airfoil component via capillary action. The resulting covered airfoil component is then placed in a furnace to fuse the cover plate to the airfoil component with the brazing alloy. However, the steps of applying the brazing alloy and the furnace treatment are typically repeated to ensure all of the gaps are adequately filled. This increases the time required to manufacture the covered airfoil components.

Additionally, excess amounts of the applied brazing alloy can flow into the hollow regions of the airfoil component, thereby requiring extra steps for applying and stopping of the brazing alloy. Excess amounts of brazing alloy may be particularly problematic if the brazing alloy flows into critical areas of the airfoil components during the brazing operation. This may result in the need to recycle or scrap the airfoil component. Accordingly, to ensure that gaps are adequately filled, while also preventing an excess amount of brazing alloy from being applied, brazing operations require monitoring by personnel. Thus, brazing operations cannot be readily automated without the use of expensive monitoring systems to apply the brazing alloys where needed. Consequentially, there is a need for turbine engine components (e.g., cover plates and airfoils) that are readily securable with brazing operations, thereby reducing the complexity, time, and cost of performing the brazing operations during manufacturing.

SUMMARY

The present invention relates to a layered structure for use with a turbine engine component, and a method of securing the layered structure to the turbine engine component. The layered structure includes a base structure and a brazing alloy layer secured to a major surface of the base structure. The brazing alloy layer is applied to the major surface prior to positioning the layered structure in contact with the turbine engine airfoil component.

DETAILED DESCRIPTION

Figure 1:
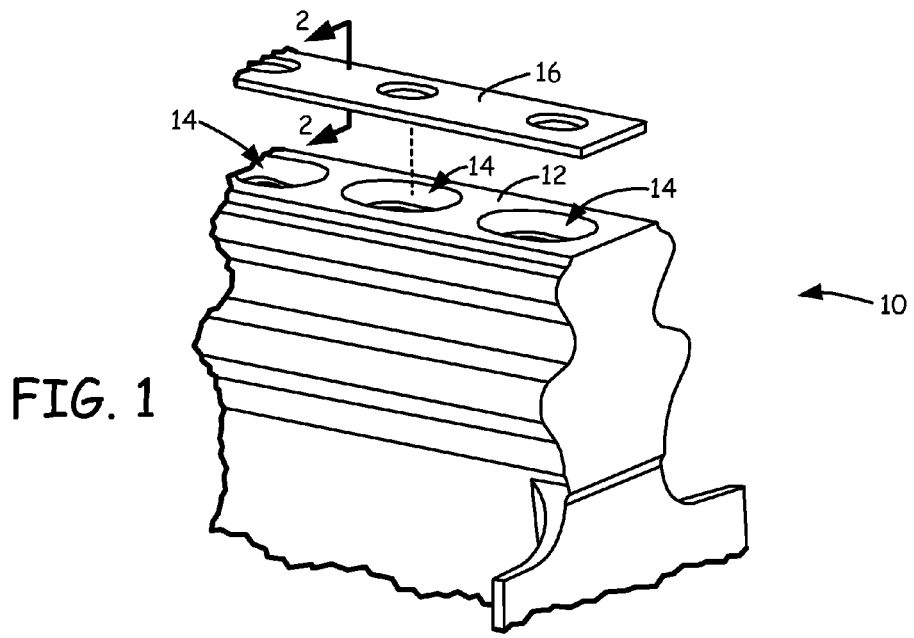
FIG. 1 is a bottom perspective view of a turbine blade root containing an airfoil cover plate being secured to a surface of the turbine blade root.

FIG. 1 is a bottom perspective view of blade root 10, which is a turbine blade root that is insertable into a dovetail slot (not shown) of a supporting rotor disk (not shown). Blade root 10 is an example of a suitable turbine engine component for use with the present invention, and includes surface 12, inlet apertures 14, and cover plate 16. Surface 12 is a wall segment extending across the bottom of blade root 10. Inlet apertures 14 are openings within surface 12 for receiving cooling air during operation. Cover plate 16 is disposed over surface 12 and inlet apertures 14. When cover plate 16 is secured to surface 12, cover plate 16 extends over inlet apertures 14 and functions as a meter plate for restricting the flow of air through inlet apertures 14 during operation.

Cover plate 16 is an airfoil cover plate that includes a pre-applied layer of a brazing material (not shown in FIG. 1), and is an example of a suitable layered structure of the present invention. During the manufacture of blade root 10, cover plate 16 may be secured to surface 12 via a brazing operation without requiring a separate step of applying a brazing alloy between surface 12 and cover plate 16. Cover plate 16 is positioned in contact with surface 12 at a desired location (e.g., over inlet apertures 14), tack welded in place, and then placed in a furnace to fuse cover plate 16 to surface 12 with the pre-applied brazing material. This reduces the time required to perform the brazing operation, and allows the brazing operation to be performed in an automated manner without requiring expensive monitoring systems.

Figure 2:
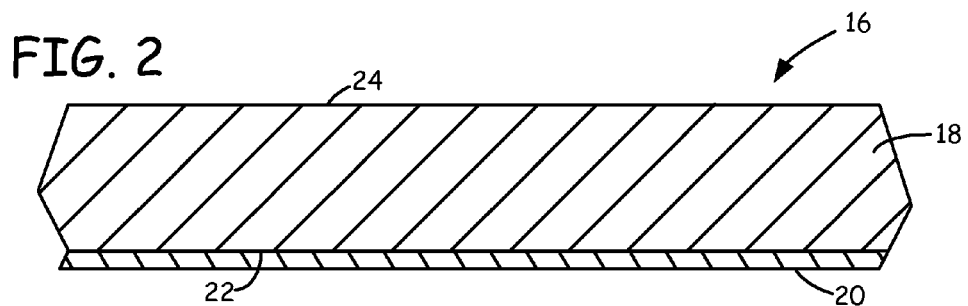
FIG. 2 is an expanded sectional view of section 2-2 taken in FIG. 1, further illustrating the airfoil cover plate, which includes a brazing alloy layer secured to a base plate.

FIG. 2 is an expanded sectional view of section 2-2 taken in FIG. 1, further illustrating cover plate 16. As shown, cover plate 16 includes base plate 18 and brazing layer 20, where base plate 18 is a metallic plate that includes opposing major surfaces 22 and 24. Base plate 18 may be cast or otherwise formed from a variety of different metals and alloys used in aerospace applications. Examples of suitable materials for base plate 18 include nickel, nickel-based alloys and superalloys, cobalt, cobalt-based alloys and superalloys, and combinations thereof; and may also include one or more additional materials such as carbon, titanium, chromium, niobium, hafnium, tantalum, molybdenum, tungsten, aluminum, and iron. Examples of particularly suitable alloys for base plate 18 include those that meet Aerospace Materials Specification (AMS) 5536 and 5537. Examples of suitable commercially available materials for base plate 18 include nickel-chromium-iron-molybdenum-based alloys under the trademark "HASTELLOY® X" (meet AMS 5536), and nickel-cobalt-chromium-tungsten-based alloys under the trademark "HAYNES 25™ (L605)" (meet AMS 5537), both from Haynes International, Inc., Kokomo, Ind.

Brazing layer 20 is a layer (or multiple layers) of a brazing material secured to surface 22. The brazing material for brazing layer 20 may also be derived from a variety of different metals and alloys used in aerospace applications. Examples of suitable brazing materials for brazing layer 20 include the suitable materials discussed above for base plate 18. Examples of particularly suitable alloys for brazing layer 20 include those that meet AMS 4777 and 4778. The brazing material for brazing layer 20 may be provided in a variety of media, such as powders, dispersions, slurries, pastes, foils, and tapes.

The brazing material is secured to surface 22 by coating the brazing material onto surface 22, and then fusing (e.g., sintering) the brazing material to surface 22, thereby forming brazing layer 20. The technique for coating the brazing material onto surface 22 may vary depending on the medium of the brazing material (e.g., powder). Examples of suitable coating techniques include deposition coating, electrostatic plating, plasma deposition, and lamination coating. Deposition coating processes are beneficial for brazing materials provided as powders, dispersions, and pastes. A suitable deposition coating process involves physically depositing the brazing material onto an upward-facing surface 22, and then drying the coating (for dispersions and pastes).

Electrostatic plating processes are beneficial for brazing materials provided as powders and dispersions. A suitable electrostatic plating process involves placing base plate 18 in a plating solution containing the brazing material, and then inducing a current between a cathode (connected to base plate 18) and an anode, thereby causing ions of the brazing material to deposit onto surface 22. Suitable plasma deposition processes include corona treatment processes, and may involve initiating a plasma reaction adjacent to surface 22, thereby allowing ions of the brazing material to deposit onto surface 22. Lamination coating processes are beneficial for brazing materials provided as dispersions and pastes. Suitable lamination coating processes include extrusion and knife coating techniques, where the coated cover plate may be subsequently dried.

The brazing material may be fused to base plate 18 by heating (e.g., furnace heating) cover plate 16 to a suitable temperature, and for a suitable duration, to interdiffuse at least a portion of the brazing material with the material of base plate 16. Suitable temperatures and durations for fusing the braze material to base plate 18 generally depend on the brazing material and the material of base plate 18. In one embodiment, the brazing material is heated using an initial, high-temperature, melting step, which is followed by a longer, lower-temperature, diffusion step. Examples of suitable temperatures for the melting step range from about 1200° C. (about 2200° F.) to about 1260° C. (about 2300° F.), and examples of suitable durations for the melting step range from about 5 minutes to about 30 minutes. Examples of suitable temperatures for the diffusion step range from about 1100° C. (about 2000° F.) to about 1200° C. (about 2200° F.), and examples of suitable durations for the diffusion step range from about 1 hour to about 20 hours.

The amount of brazing material coated onto surface 22 generally determines the thickness of brazing layer 20. Correspondingly, this also dictates the amount of brazing material that is available during a brazing operation to fuse cover plate 16 to surface 12 of blade root 10 (shown in FIG. 1). Thus, for a particular brazing operation, an appropriate amount of brazing material may be pre-applied to base plate 18, as measured by the thickness of brazing layer 20. This precludes the need to manually apply brazing materials to gaps between surface 12 and cover plate 16, which is otherwise required to ensure that the amount of brazing material applied is neither deficient nor excessive.

Suitable thicknesses for the brazing layer (e.g., brazing layer 20) may vary depending on the particular application. However, for base plate thicknesses ranging from about 0.25 millimeters (about 0.01 inches) to about 2.5 millimeters (about 0.1 inches), examples of suitable thicknesses for the brazing layer range from about 25 micrometers (about 0.001 inches) to about 250 micrometers (about 0.01 inches), with particularly suitable thicknesses ranging from about 25 micrometers (about 0.001 inches) to about 130 micrometers (about 0.005 inches). The brazing layer thicknesses discussed herein refer to thicknesses obtained after the brazing material is secured (e.g., fused) to the base plate 18.

Brazing layer 20 is desirably coated onto (and secured to) base plate 18 across the entire surface area of surface 22. This allows brazing material to be available to fuse any point across surface 22 to an airfoil component. This also precludes the need to mask or otherwise pattern surface 22 to coat the brazing material at particular locations on surface 22. In alternative embodiments, however, brazing layer 20 may be secured to base plate 18 over only one or more portions of the surface 22, as individual needs may necessitate.

In one embodiment, the thickness of brazing layer 20 may vary at different points across surface 22 (i.e., non-uniform thicknesses). This may be accomplished by varying the amount of brazing material that is coated onto surface 22. This is beneficial for brazing operations that require different amounts of brazing material at different locations. For example, when cover plate 16 is positioned against surface 12 of blade root 10, a first location between surface 12 and cover plate 16 may require a first amount of brazing material to form a suitable weld, while a second location may require a second amount of brazing material to form a suitable weld. Varying the thickness of brazing layer 20 allows the appropriate amounts of brazing material to be used for each location without causing an excess or deficiency of brazing material at the other locations.

Figure 3:
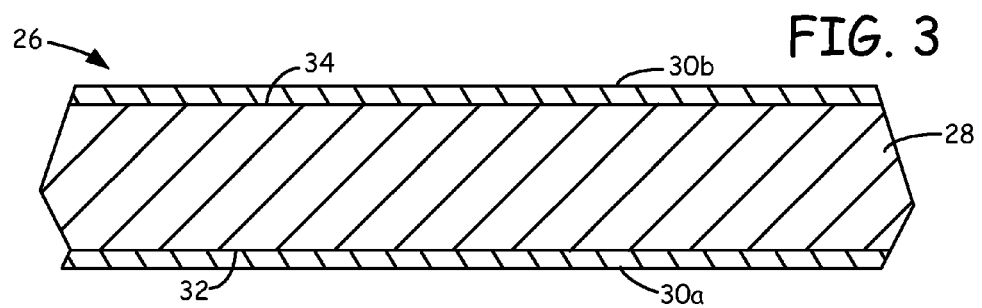
FIG. 3 is an alternative expanded sectional view of section 2-2 taken in FIG. 1, showing an alternative airfoil cover plate that includes a pair of brazing alloy layers secured to a base plate.

FIG. 3 is an alternative expanded sectional view of section 2-2 taken in FIG. 1, which includes cover plate 26. Cover plate 26 is an alternative to cover plate 16 (shown in FIG. 2), and includes base plate 28 and brazing layers 30a and 30b, where base plate 28 includes opposing major surfaces 32 and 34. Surface 32 is a first major surface and surface 34 is a second major surface. Base plate 28 is metallic plate similar to base plate 18 (shown in FIG. 2), and may be cast or otherwise molded from the same materials discussed above for base plate 18. Brazing layers 30a and 30b are layers of brazing materials similar to brazing layer 20 (shown in FIG. 2), which are secured to surface 32 and 34, respectively. Brazing layer 30a is a first brazing layer and brazing layer 30b is a second brazing layer. Suitable brazing materials, methods of coating and fusing, and thicknesses for brazing layers 30a and 30b are the same as those discussed above for brazing layer 20.

Cover plate 26 is beneficial for allowing an error-free application during a brazing operation. Because both major surfaces of base plate 28 (i.e., surfaces 32 and 34) are covered with brazing layers (i.e., brazing layers 30a and 30b), either major surface of cover plate 26 can be fused to surface 12 (shown in FIG. 1). As such, the manufacturer is not required to determine which major surface of cover plate 26 needs to face surface 12. This reduces the time and effort required to secure cover plate 26 to surface 12.

While the above-discussed embodiments involve the use of cover plates (i.e., cover plates 16 and 26) for covering inlet apertures 14 of blade root 10, layered structures of the present invention may be used with any turbine engine component (e.g., turbine blades and vanes) that require brazed base structures (e.g., base plates 18 and 28) during manufacturing. For example, many airfoil components require wrought alloy plates that are not castable with the airfoil component. Such plates may be coated with brazing materials as discussed above, and then subsequently fused to the airfoil components with the brazing materials. This correspondingly increases the throughput of the airfoil components during manufacturing. Examples of suitable turbine engine components that may be used with layered structures of the present invention include high pressure turbine blades, low pressure turbine blades, high pressure turbine vanes, low pressure turbine vanes, blade outer airseals, shrouds, and structural components such as bearing housings, ducts, and supports.

Figure 4:
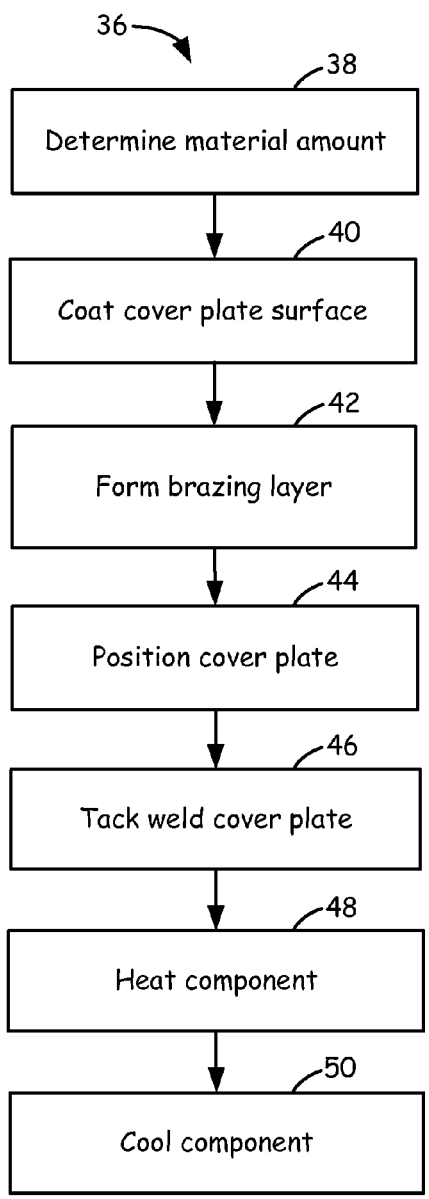
FIG. 4 is a flow diagram of a method of forming a covered airfoil component with an airfoil cover plate of the present invention.

FIG. 4 is a flow diagram of method 36 for forming a turbine engine component with a layered structure of the present invention (e.g., cover plates 16 and 26, shown in FIGS. 1-3). The following discussion of method 36 is made with reference to an airfoil component with the understanding that method 36 may also be used to form a variety of turbine engine components. As shown, method 36 includes steps 38-50, and initially involves predetermining a required amount of brazing material that is needed for a particular brazing operation (step 38). As discussed above, the required amount of brazing material is desirably an appropriate amount that reduces the risk of having an excess or deficiency of brazing material. The predetermined amount of brazing material may be measured as a desired thickness of a brazing layer (or thicknesses for a non-uniformly thick layer).

The brazing material is then coated onto a major surface of an airfoil cover plate (step 40). Suitable cover plate materials, brazing materials, and methods of coating are the same as those discussed above for base plate 18 and brazing layer 20 (shown in FIG. 2). The amount of brazing material coated is desirably based on the intended thickness (or thicknesses) of the brazing layer, which is correspondingly based on the predetermined amount of brazing material to be used.

The brazing material is then fused to the surface of the cover plate to form a brazing layer (step 42). Suitable techniques for fusing the brazing material to the surface of the cover plate include those discussed above for brazing layer 20. As discussed above, each major surface of the cover plate (e.g., cover plate 26) may be coated with brazing material to form a pair of brazing layers, thereby providing an error-free application during a brazing operation.

The cover plate is then positioned against a surface of an airfoil component such that the brazing layer contacts the surface of the airfoil component (step 44). The cover plate is then tack welded or otherwise adhered to the surface of the airfoil component to prevent the cover plate from moving during the brazing operation (step 46). The covered airfoil component is then heated to fuse the cover plate to the surface of the airfoil component with the brazing layer (i.e., a brazing operation) (step 48). The heating causes the brazing material of the brazing layer to interdiffuse into the surface of the airfoil component.

The brazing operation may be performed in a furnace or other similar heating system. Suitable temperatures and durations for the brazing operation generally depend on the brazing material and the material and the material of the airfoil component. Examples of suitable temperatures and durations for the brazing operation includes those discussed above (e.g., the melting and diffusion steps). After the brazing operation is completed, the covered airfoil component is then cooled, thereby forming a brazed weld between the cover plate and the airfoil component (step 50).

As discussed above, the use of the pre-applied brazing layer precludes the need for applying a brazing material between the cover plate and the surface of the airfoil component. The brazing layer provides an appropriate amount of brazing material to create a brazed weld that substantially fills the gaps between the cover plate and the surface of the airfoil component, while also reducing the amounts of excess brazing material. This accordingly reduces the time required to perform the brazing operation, and allows the brazing operation to be performed in an automated manner.

Figure 5:
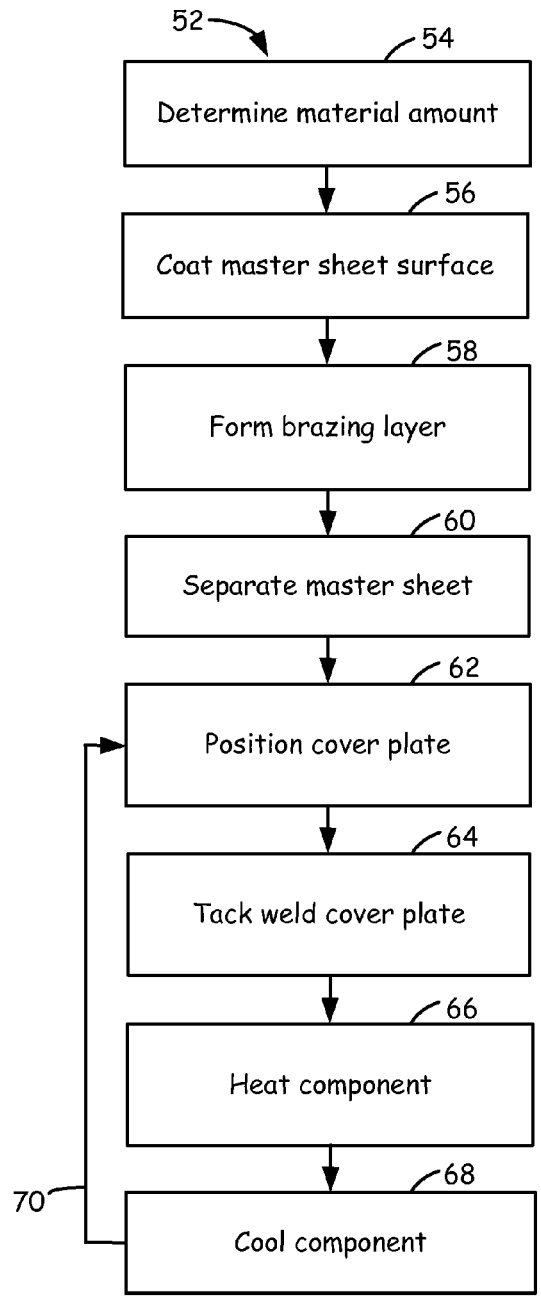
FIG. 5 is a flow diagram of an alternative method of forming a covered airfoil component with an airfoil cover plate of the present invention.

FIG. 5 is a flow diagram of method 52, which is an alternative to method 36 (shown in FIG. 4). As discussed below, method 52 involves the use of a master sheet that is separable into multiple cover plates, thereby allowing brazing layers to be formed on multiple cover plates with a single coating operation. Method 52 includes steps 54-68, and initially involves predetermining a required amount of brazing material that is needed for a particular brazing operation (step 54). The predetermined amount of brazing material may be measured as a desired thickness of a brazing layer (or thicknesses for a non-uniformly thick layer).

In one embodiment, the multiple cover plates are intended for a common purpose (e.g., all of the cover plates from the master sheet will be used in the same manner, such as meter plates). In this embodiment, the required amount of brazing material may be the same for each cover plate, thereby allowing a uniform thickness to be used over the entire master sheet. In another embodiment, the multiple cover plates are intended for different purposes. In this embodiment, the required amount of brazing material may be different for each cover plate. As such, the intended thickness of the brazing layer may vary over the surface area of the master sheet.

The brazing material is then coated onto a major surface of the master sheet (step 56). Suitable master sheet materials, brazing materials, and methods of coating are the same as those discussed above for base plate 18 and brazing layer 20 (shown in FIG. 2). The amount of brazing material coated is desirably based on the intended thickness (or thicknesses) of the brazing layer, which is correspondingly based on the predetermined amount of brazing material to be used.

The brazing material is then fused to the surface of the master sheet to form a brazing layer (step 58). Suitable techniques for fusing the brazing material to the surface of the master sheet include those discussed above for brazing layer 20. Alternatively, each major surface of the master sheet may be coated with brazing material to form a pair of brazing layers, similar to that discussed above for meter plate 26 (shown in FIG. 3).

The master sheet is then separated into multiple cover plates, where each cover plate includes at least one brazing layer (step 60). The master sheet may be separated into multiple cover plates using a variety of techniques, such as laser cutting, waterjet cutting, and stamping operations. As discussed above, the use of the master sheet allows a single coating operation to be used to apply brazing layers onto multiple cover sheets.

One of the cut-out cover plates is then positioned against a surface of an airfoil component such that the brazing layer contacts the surface of the airfoil component (step 62). The cover plate is then tack welded or otherwise adhered to the surface of the airfoil component to prevent the cover plate from moving during the brazing operation (step 64). The covered airfoil component is then heated (step 66) and cooled (step 68), thereby forming a brazed weld between the cover plate and the surface of the airfoil component. Steps 62-68 may then be repeated for each cover sheet cut-out of the master sheet (as represented by arrow 70). Accordingly, a single coating operation can be used to apply brazing layers on multiple cover plates. This precludes the need to manually apply brazing materials during each brazing operation, thereby increasing manufacturing throughput.

Although the present invention has been described with reference to preferred embodiments, workers skilled in the art will recognize that changes may be made in form and detail without departing from the spirit and scope of the invention.

The invention claimed is:

1. A method for manufacturing a turbine engine component, the method comprising:
    providing a layered structure having a major surface and a brazing layer secured to the major surface, wherein the major surface is a first major surface and the brazing layer is a first brazing layer, wherein the layered structure also has a second major surface opposite the first major surface, and wherein the layered structure further comprises a second brazing layer secured to the second major surface;
    positioning the layered structure onto a turbine engine component surface such that at least a portion of the brazing layer contacts the turbine engine component surface;
    heating the turbine engine component containing the layered structure; and
    cooling the turbine engine component, thereby fusing the layered structure to the turbine engine component with the brazing layer.

2. The method of claim 1, further comprising:
    coating a brazing material onto the major surface of the layered structure; and
    fusing the brazing material to the layered structure.

3. The method of claim 1, wherein heating the turbine engine component containing the layered structure comprises heating the turbine engine component to a temperature ranging from about 1200° C. to about 1260° C.

4. The method of claim 1, wherein the brazing layer has a thickness ranging from about 25 micrometers to about 250 micrometers.

5. The method of claim 4, wherein the thickness of the brazing layer ranges from about 25 micrometers to about 130 micrometers.

6. The method of claim 1, wherein the brazing layer is derived from a brazing material selected from the group consisting of nickel, nickel-based alloys, nickel-based superalloys, cobalt, cobalt-based alloys, cobalt-based superalloys, and combinations thereof.

7. A method for manufacturing an airfoil component, the method comprising:
    determining an amount of brazing material required to perform a brazing operation;
    coating a brazing material onto the major surface of the cover plate wherein the major surface is a first major surface and the brazing layer is a first brazing layer, wherein the cover plate also has a second major surface opposite the first major surface, and wherein the cover plate further comprises a second brazing layer secured to the second major surface; and
    fusing the brazing material to the cover plate to form a brazing layer having a thickness based at least in part on the determined amount of brazing material;
    positioning the cover plate such that at least a portion of the brazing layer contacts an airfoil component surface; and
    brazing the airfoil component containing the cover plate.

8. The method of claim 7, wherein brazing the airfoil component containing the cover plate comprises:
    heating the airfoil component containing the cover plate comprises heating the airfoil component to a temperature ranging from about 1200° C. to about 1260° C.; and
    cooling the heated airfoil component.

9. The method of claim 7, wherein the thickness of the brazing layer ranges from about 25 micrometers to about 250 micrometers.

10. The method of claim 9, wherein the thickness of the brazing layer ranges from about 25 micrometers to about 130 micrometers.

11. The method of claim 7, wherein the brazing layer is derived from a brazing material selected from the group consisting of nickel, nickel-based alloys, nickel-based superalloys, cobalt, cobalt-based alloys, cobalt-based superalloys, and combinations thereof.

* * * * *